United States Patent [19]

Nagasaka

[11] Patent Number: 4,743,143
[45] Date of Patent: May 10, 1988

[54] POWDER FLOW-RATE MEASURING AND CONTROLLING APPARATUS

[76] Inventor: Hideo Nagasaka, 2-21-33, Minamitakano-machi, Hitachi-city, Ibaraki-prefec., Japan

[21] Appl. No.: 907,058

[22] Filed: Sep. 12, 1986

[30] Foreign Application Priority Data

Sep. 17, 1985 [JP] Japan .................. 60-204978

[51] Int. Cl.[4] ............................................. B65G 53/66
[52] U.S. Cl. ....................................... 406/14; 406/30; 406/152
[58] Field of Search ..................... 406/14, 30

[56] References Cited

U.S. PATENT DOCUMENTS 4,480,947 11/1984 Nagasaka ............................. 406/14

Primary Examiner—Joseph F. Peters, Jr.
Assistant Examiner—James M. Kannofsky
Attorney, Agent, or Firm—Price, Heneveld, Cooper, DeWitt & Litton

[57] ABSTRACT

It is provided a powder flow-rate measuring apparatus wherein a conveying fluid is blown into the inlet of a detecting pipe line with a nozzle, a powder in fluidized state is introduced into said inlet, and the generated pressure difference due to acceleration of powder in the detecting pipe line is detected by means of a differential pressure gauge which communicates with an inlet side pressure detecting port arranged upstream the outlet of said nozzle and an outlet side pressure detecting port arranged at the outlet of detecting pipe line. The apparatus has characteristics stable for long period of time and is operable in a wide measuring range.

10 Claims, 6 Drawing Sheets

POWDER FLOW-RATE MEASURING AND CONTROLLING APPARATUS

FIELD OF THE INVENTION

This invention is concerned with improvements in an apparatus for measuring and controlling the flow rate of powder being pneumatically conveyed.

DESCRIPTION OF THE PRIOR ART

As a prior apparatus of this kind, there is an apparatus disclosed in the specification and the accompanying drawings of Japanese Patent Application No. 56-093542 corresponding to U.S. Pat. No. 4,480,947 which has been filed by the present inventor.

Figure 6:
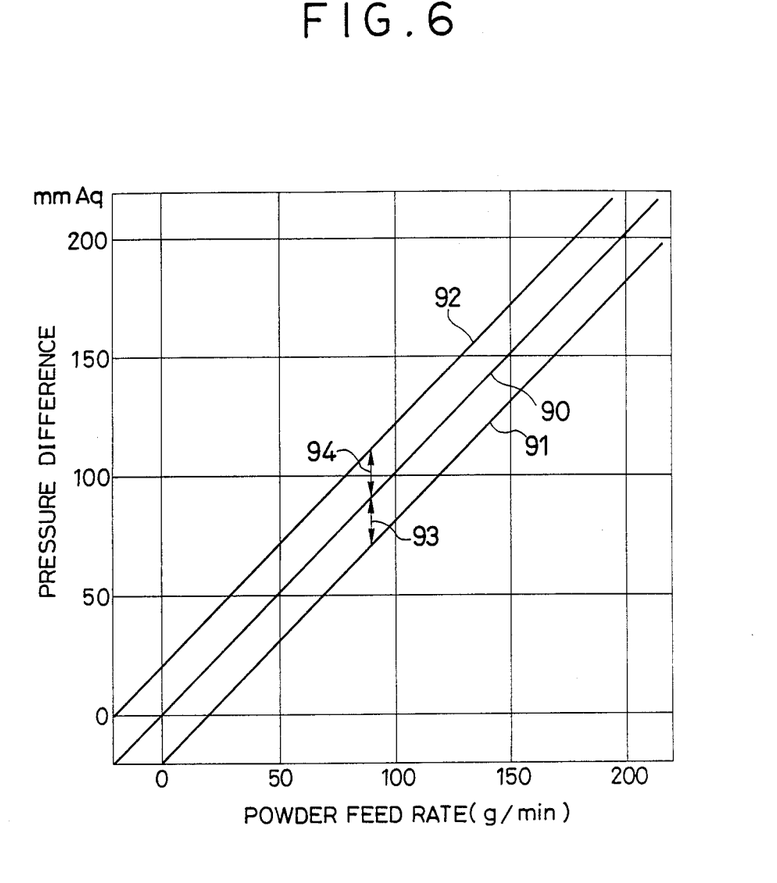
FIG. 6 is a graph showing working curves for the powder flow-rate measuring apparatus.
Figure 7:
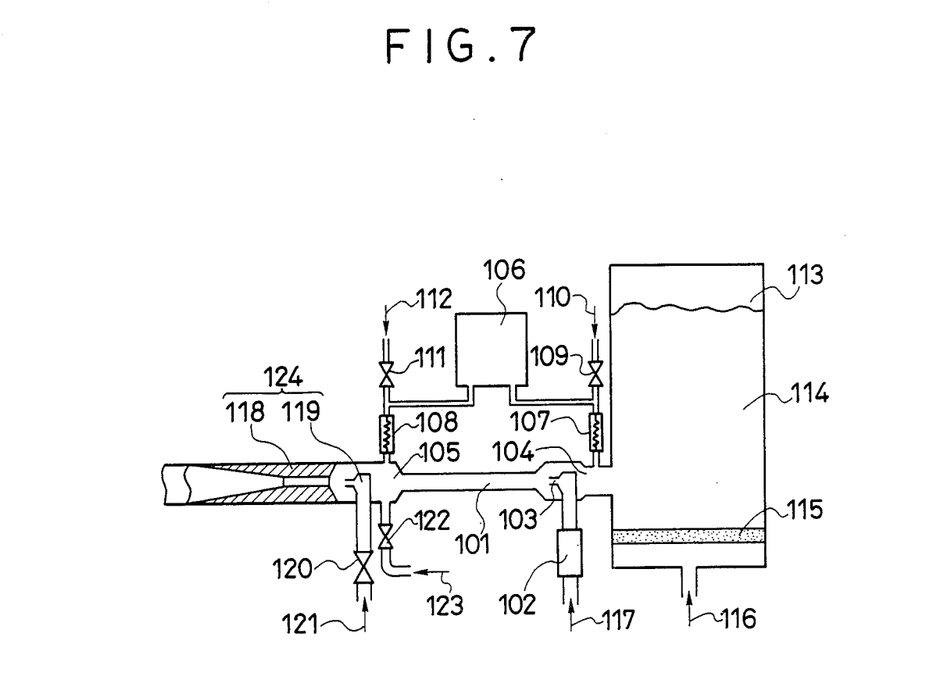
FIGS. 7 and 8 are respective front views, partly sectional, of the powder flow-rate measuring apparatuses of the prior art.

FIG. 7 of the accompanying drawings of this application represents the principal part of the aforementioned prior apparatus for measuring the flow rate of powder being pneumatically conveyed. In this powder flow-rate measuring apparatus, a conveying fluid 117 is blown into the inlet of a detecting pipe line 101 having an inlet 104 and a outlet 105 from a nozzle 103 via a flow rate regulating means 102, a powder 114 which has been fluidized by a gas 116 blown into a powder storage tank 113 through a perforated plate 115 is introduced into inlet 104, a pressure difference generated by acceleration of powder in detecting pipe line 101 is detected by differential pressure gauge 106 via fluid resistors 108 and 107, and the detected pressure difference is utilized for estimating the flow rate of the powder in the detecting pipe line 101. By virtue of this apparatus, the relation between the feed rate of powder and the pressure difference across the detecting pipe line 101 measured by the differential pressure gauge 106 has a good linearity in a broad range, as shown by a working curve 90 in FIG. 6. In addition, the structure of the apparatus is quite simple. Thus, this apparatus can conveniently be used for detecting a flow rate of a powder being pneumatically conveyed and has a very broad application field. In this case, the fluid resistors 107 and 108 are both for gas. The working curve can be parallel displaced, as shown by arrow 93 or 94 in FIG. 6, by blowing in a gas 110 or 112 for parallel displacing the working curve through valve 109 or 111. Gases 110 and 112 additionally play a role of preventing a back-flow of powder toward the differential pressure detecting device 106. In this case, when the flow rate of gas 110 is increased, the working curve is parallel displaced so that the pressure difference increases. When the flow rate of gas 112 is increased, the working curve is parallel displaced so that the pressure difference decreases. Moreover, the slope of the linear working curve can be varied by flow rate regulating means 102. When the flow rate of conveying gas is increased, the slope of the working curve increases. The slope of the working curve can be decreased by diminishing the flow rate of conveying gas.

In the powder flow-rate measuring apparatus shown in FIG. 7, in order to modulate the flow rate of powder, a vacuum is generated in the outlet 105 of detecting pipe line by introducing a driving gas 121 of constant flow rate via valve 120 into an injector 124 comprising a throat 118 and a nozzle 119, and the degree of vacuum in the outlet 105 of detecting pipe line is regulated by introducing a drive regulating fluid 123 via valve 122. Thus, the flow rate of powder is regulated.

Figure 8:
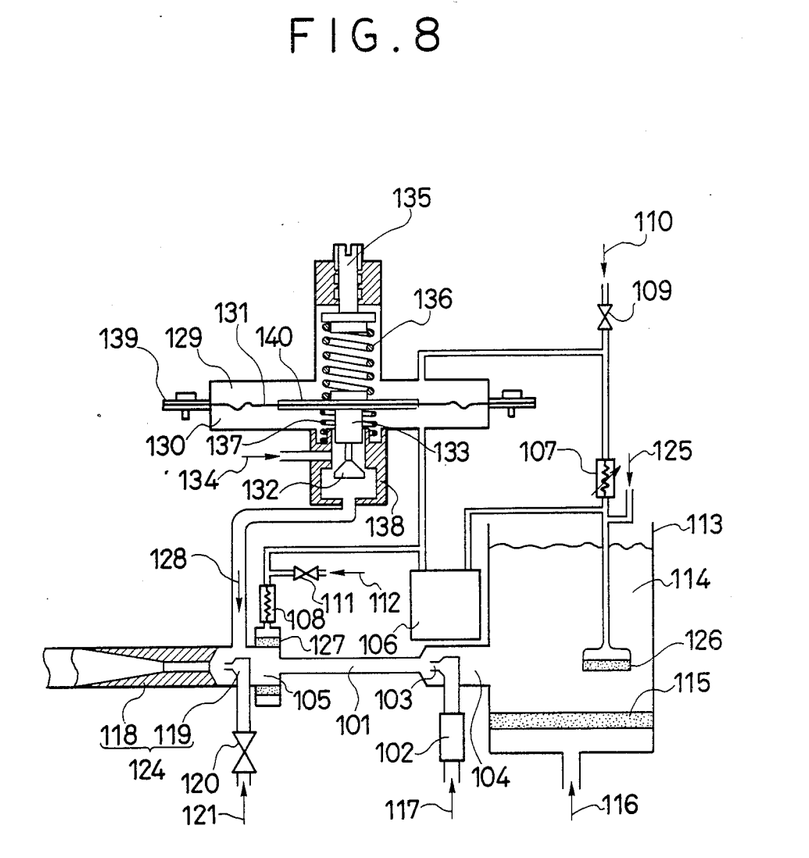

FIG. 8 illustrates an automatic control system for feeding powder which has a function of automatically controlling powder flow-rate. This system has been developed on the basis of the powder flow-rate detecting apparatus shown in FIG. 7.

In the system illustrated in FIG. 8, the following operation is substituted for the measurement of pressure difference between the inlet and the outlet of detecting pipe line 101 which is generated proportional to the feed rate of powder. On the inlet side, the direct measurement at outlet 104 is replaced by an operation of detecting a pressure on a level with the detecting pipe line 101 in a fluidized powder bed 114 through a porous plate 126. On the outlet side, a pressure is detected through a porous cylindrical wall 127 surrounding outlet 105. These two pressures are led to a differential pressure gauge 106 and the pressure difference is detected. A relation similar to that shown by working curve 92 in FIG. 6 is obtained between the detected pressure difference and the powder flow rate. The powder flow rate can be estimated as in the case of the apparatus shown in FIG. 7. One feature of the system for measuring the powder flow rate as shown by FIG. 8, consists in that the detections of pressures on the inlet and outlet sides are conducted through the porous plate 126 and the porous cylindrical wall 127, respectively. Due to this provision, the back flow of powder toward the measuring system can be surely prevented to be characteristic. A purging gas 125 and a working curve-modulating gas 112 are frequently passed through porous plate 126 and porous cylindrical wall 127, respectively, to purge gas. By virtue of this arrangement, the infiltration of powder is inhibited so that the fluctuation in fluid resistance is prevented. It is another feature of the system illustrated in FIG. 8 that the system has a control valve 139 for preventing the fluctuations in feed rate of powder, such as that due to fluctuation in level of fluidized powder bed in powder tank 113, by automatic control, and for maintaining a constant feed rate of powder. Thus, the system has a function of keeping always a feed rate of powder at a constant value by eliminating various adventitious disturbances.

Specifically, the pressure corresponding to that in inlet 104 of detecting pipe line is usually stably detected through porous plate 126 and is led to a high pressure chamber 129 of the control valve 139 via a setting fluid resistor 107. On the other hand, the pressure on the outlet side of detecting pipe line is led through a porous cylindrical wall 127 and a working curve-modulating fluid resistor 108 to a low pressure chamber 130 of control valve 139. The interior of control valve 139 is divided into a high pressure chamber 129 and a low pressure chamber 130 by a diaphragm 131 and a center plate 140. These are connected to control valve by means of springs 136 and 137. Below the center plate 140 of control valve, a valve disk 132 and a valve stem 133 in one piece are slidably fitted in a valve body 138. The control valve is so fabricated that a high pressure gas 134 adjusted to a constant pressure is introduced halfway between the valve stem and the valve disk. The control valve is accommodated to an actuation that the control valve opens rapidly when the pressure difference between both sides of diaphragm 131 reach a value set by modulating the position of a finger grip 135. The opening results in emitting of a controlling gas 128 from the clearance made between valve body 138 and valve disk 132 to the outlet 105 of a detecting pipe line 101, i.e. vacuum chamber of injector 124. As a result of this structure, when the pressure difference across the detecting pipe line exceeds the set value corresponding to a predetermined feed rate of powder, the controlling gas rapidly increases and the degree of vacuum in injector 124 lowers to prevent the fluctuation in flow rate of the powder. On the other hand, when the flow rate of powder becomes less than the set value, the controlling gas 128 rapidly decreases and the degree of vacuum in outlet 105 increases to restore the feed rate to the set value. In summary, the system illustrated by FIG. 8 provides an apparatus wherein the feed rate of powder set by a finger grip 135 can be substantially always kept at a constant value by means of a quite simple controlling device.

In the powder flow-rate detecting system of the prior art shown in FIG. 7, the working curve-modulating gas 110 which is introduced into inlet 104 of detecting pipe line through a fluid resistor 107 is added to the high speed air ejected from nozzle 103 into detecting pipe line 101. Accordingly, the detecting characteristic of detecting pipe line 101 varies in some degree when the flow rate of working curve-modulating gas 110 is changed. This fact is not important in measurement of powder flow rate because the flow rate of working curve-modulating gas is relatively small. However, it is a resulting drawback that the adjustment of the powder flow-rate measuring system becomes complicated. In the powder flow-rate detecting system shown in FIG. 7, the modulation of powder flow rate is performed also by lowering the degree of vacuum in outlet 105 of detecting pipe line with introducing a drive regulating fluid 123. To operate the system in this manner, it is necessary that the flow rate of driving fluid 121 is at a presumable maximum value. Moreover, a drive regulating fluid 123 is added thereto for regulation. Thus, the amount of air to be used for conveying powder increases to enlarge the consumption of a conveying gas. Simultaneously, a problem arises that the flow rate of conveying gas is too large for the characteristics of downstream equipments in the whole powder measuring and feeding apparatus and the efficiency of the whole apparatus is lowered.

The apparatus shown in FIG. 8 is an automatic apparatus wherein the measuring apparatus shown by FIG. 7 is added with an automatic control valve 139. This apparatus also has a drawback that the amount used of a conveying gas tends to be excessive. Moreover, as the apparatus is automatic, it is required that the flow rate of driving fluid 121 is set with allowing some margin. Accordingly, the required amount of a conveying fluid in a automatic apparatus, such as that shown by FIG. 8, tends to be more excessive than that in the case of operating manually the apparatus of FIG. 7. To solve this problem is requested. Furthermore, when a porous plate 126 or a porous cylindrical wall 127 is employed for detecting the pressure in inlet or outlet of a detecting pipe line 101 and the powder to be conveyed includes a mixed fine powder, such a fine powder back flows into the porous plate due to the minute fluctuation of pressure in tank or pipe line to accumulate therein. As a result, the ventilation resistance in the porous plate or the porous cylindrical wall changes and the working curve deviates from the original position. These raise a quite difficult problem for measuring apparatus. To solve this problem is also requested. In the powder flow-rate detecting systems shown by FIGS. 7 and 8, the intake for powder must be arranged in a part relatively near the bottom of tank, in order to avoid any influence of increase or decrease in the amount of powder in the tank. The method of taking the powder from the upper part of the tank can hardly be applied to the systems illustrated by FIGS. 7 and 8. To improve the apparatus at this point is also requested. Provided that the powder has a characteristic of being fluidized with difficulty and a channeling tends to be caused, the arrangement of an intake for the powder near the bottom of tank promotes the channeling. Especially, when the powder has a high specific gravity and a very low rate of powder is intended to be measured, the working curve becomes unstable. This is further a problem. Especially, when the inlet of detecting pipe line 101 is near the perforated plate in the bottom part of tank, the tendency toward channeling becomes remarkable in many cases. It is preferred that the detecting pipe line 101 is made of fluororesin or the like to which particles of powder hardly adhere. As the detecting pipe line wears after use for long period of time, the detecting pipe line should be so constructed that the interchange may be done with great facility. It is necessary that the construction of detection pipe line has means for detecting pressure in their inlet and outlet as integral part and is adapted to easy maintenance.

SUMMARY OF THE INVENTION

For solving the problems of the prior art of which the summary has been described with referring to FIGS. 7 and 8, the first countermeasure consists in that a part of a conveying gas to be blown into the detecting pipe line is separated immediately downstream a flowmeter for said conveying gas by a working curve-shifting gas, that the separated gas is made to join the remaining conveying gas at an inlet side pressure detecting port provided upstream the outlet port of nozzle, and that the pressure in the inlet of detecting pipe line is detected from the pipe line where said working curve-shifting gas flows.

By this countermeasure, the powder cannot flow backward as a sufficient amount of conveying gas flows always with a high velocity in the nozzle for blowing conveying gas. The thus-detected pressure is practically equal to the pressure in the inlet of detecting pipe line, and is affected quite minutely by the variation of the flow rate of conveying fluid. Thus, the pressure in the inlet of detecting pipe line can be detected in the very stable state for a long period of time. Further, by this countermeasure, the gas for parallel displacing the working curve constitutes a part of conveying gas and the whole conveying gas is blown stably into the detecting pipe line. Consequently, the slope of working curve is by no means affected by setting an amount of a working curve-shifting gas, in contrast to the apparatuses shown by FIGS. 7 and 8. The period of time for the the initial conditioning can be remarkably shortened.

The second countermeasure for solving problems consists in that the driving gas blown into the injector nozzle as means for regulating the powder flow rate is directly modulated and the system of blowing a drive regulating fluid into the vacuum chamber of injector is eliminated. When this is the case, the total amount of air required for conveying powder can be reduced. If an additional conveying gas is required for an apparatus arranged downstream, the necessary amount of gas may be made to join the main current of conveying gas at the outlet of injector.

To constitute a automatic control system for the powder flow rate, it is required that a control valve which has a simple construction and a so high sensibility that a minute pressure difference, such as of the order of 1 mm water, can actuate sufficiently the controlling function thereof is provided. The above-mentioned control valve can be obtained by modifying the control valve shown in FIG. 8 to be one shown in FIG. 2. This is the third countermeasure for solving problems.

The fourth countermeasure for solving problems consists in that a powder introducing conduit comprising a narrow pipe for sucking upward the powder from a fluidized powder bed to feed is provided at the inlet of detecting pipe line. By this provision, the apparatus becomes possible to operate with the detecting pipe line positioned higher than the surface of fluidized powder bed in tank. In addition, when a powder having a less tendency to be fluidized is handled, the provision of this powder introducing conduit can bring about a stable working curve with good linearity in a wide range. Further, in the case of a powder having a high specific gravity, the application of a powder feeding short pipe for feeding the powder to the inlet of detecting pipe line from above permits a stable feeding of powder in a wide range. Moreover, in the case of some objective powders, such as powder of very high specific gravity, the introduction of the powder from the side into the inlet of detecting pipe line and the provision of a powder arresting member straight over the inlet of detecting pipe line may result to the advantage. When the objective powder tends to be fluidized and has a relatively low specific gravity as is the case of a powder coating material, it is better to dispose a short powder introducing conduit having a shape of truncated cone and opening downward. The adoption of any one selected from the group of these various powder introducing means depending on the properties of an objective powder which have been elucidated by tests, is an appropriate means for obtaining a working curve with good linearity. Thereby, a convenient powder flow-rate detecting apparatus can be realized.

The certainty in adjustment of the slope of working curve is remarkably enhanced, as compared with that of the prior art, due to the facts that the pressure in the inlet of detecting pipe line is detected at an inlet side pressure detecting port which opens upstream the outlet of a conveying gas nozzle, the conveying gas and the inlet pressure-shifting gas are separately regulated, a flowmeter for detecting their total flow rate is provided, and, thus, the total flow rate in the detecting pipe line can be set with certainty. As the inlet side pressure detecting port is situated near the outlet of nozzle where a large amount of conveying gas flows always at a high speed, the powder cannot flow backward into an inlet pressure detecting pipe line nor into the porous plate. Accordingly, the period of stable operation can be markedly extended and the labor hour for regulation and maintenance can be remarkably reduced.

For modulating the powder flow rate, the amount of driving gas in injector was kept at its maximum value, and the degree of vacuum in the vacuum chamber at inlet of injector was lowered by means of a drive regulating gas. These expedients of the prior art markedly increased the total amount of gases employed for conveying the powder and the conveying speed of powder was wastefully too high. These are the drawbacks of the apparatus of the prior art. In accordance with this invention, the direct modulating of the blowing speed of driving gas enables the efficiency of injector to increase, and the conveying speed of powder in the injector and downstream can be regulated to a minimum of sufficient values.

Means for introducing the powder into the inlet of detecting pipe line is selected, depending on the properties of powder as object of conveying, from the group consisting of a powder introducing conduit comprising a narrow pipe for sucking upward the powder, a short pipe for permitting the powder to fall downward from above, a powder introducing side conduit with a powder arresting member provided straight over the inlet of detecting pipe line, and a short powder introducing conduit having a shape of truncated cone and opening downward. A stable working curve with good linearity in a wide range can be obtained by applying a powder introducing system corresponding to the characteristics of objective powder which have been elucidated by testing.

The present invention will be better understood from the following description taken in conjunction with the accompanying drawings.

DESCRIPTION OF THE PREFERRED EMBODIMENTS

Figure 1:
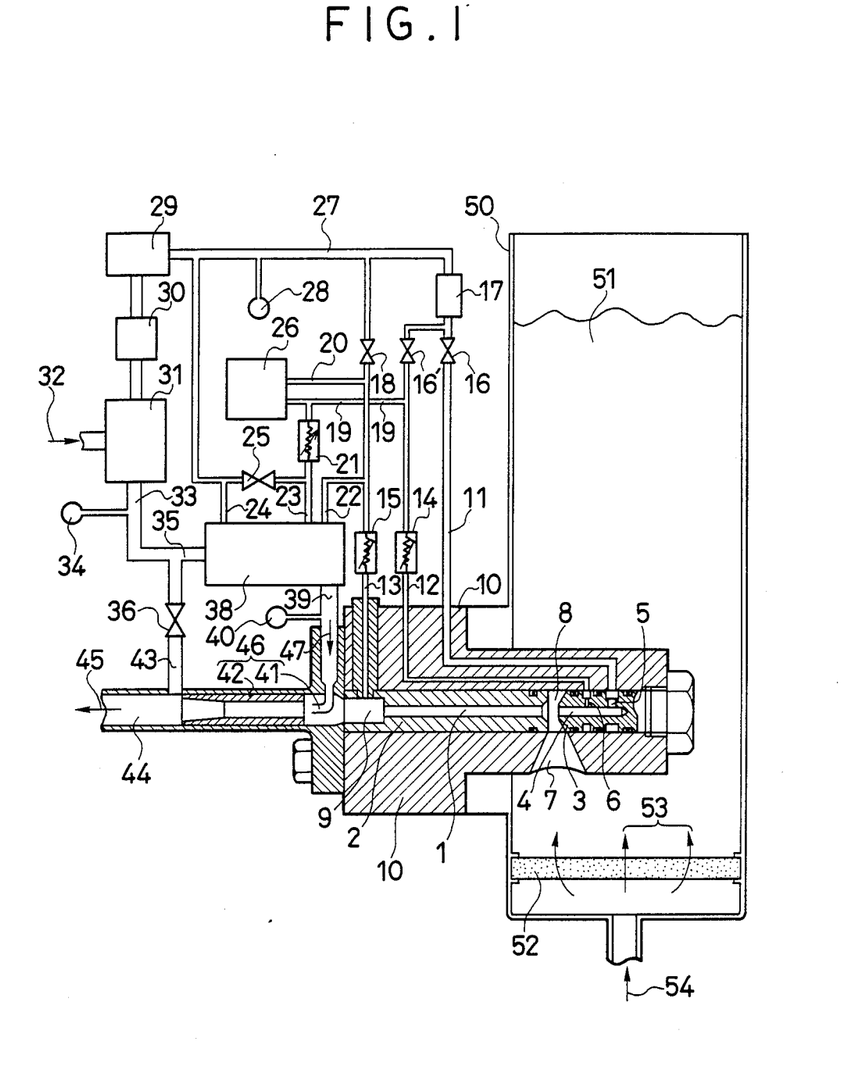
FIG. 1 is a front view, partly sectional, of one embodiment according to this invention.

In the powder flow-rate measuring and controlling apparatus shown by FIG. 1, a detecting pipe line 1 is shaped as a passage having a small circular cross section by boring along the axis of a sensor tube 2. The sensor tube is usually made of a material, such as fluororesin, to which particles of powder, e.g. teflon, hardly adhere. However, when the object to be measured is a powder of a material having no adhesion property, such as fluoroplastics and polyethylene, other wear-resistant materials can be employed for sensor tube. Wear-resistant ceramic materials may be applied depending on the type of the objective powder. A sensor nozzle 3 for feeding a conveying gas into the detecting pipe line 1 has a sensor nozzle orifice 4 along its axis, said orifice being coaxial with the detecting pipe line. A conveying gas of a flow-rate regulated by a valve 16 is introduced from a conveying gas feeding port 5 into the nozzle. In the sensor nozzle 3, an inlet pressure detecting port 6 opens upstream from the sensor nozzle orifice. A part of a conveying gas of which the flow rate is regulated by a valve 16' flows into the inlet pressure detecting port 6 through an inlet side fluid resistor 14 and a pipe line 12. In this case, a flowmeter 17 is so connected that the total flow rate of conveying gas streams through valves 16 and 16' may be measured by the flowmeter 17, both streams being blown together into the detecting pipe line from the sensor nozzle orifice in the end, as shown in FIG. 1. The sensor tube 2 is arranged in a sensor body 10 so as to be coaxial with the sensor nozzle 3 as shown in FIG. 1, and its position in the direction of axis is fixed. The inlet 8 between sensor tube 2 and sensor nozzle 3 is adapted to introduce a part of fluidized powder bed 51 through a powder introducing port 7, which is caused by a gas 54 fed into a tank 50 through a perforated plate 52 disposed in the bottom part of the tank, as shown by arrow 53. The sensor body 10 is mounted on tank 50 to fix. An outlet side pressure transmission pipe 13 opens in the outlet 9 of sensor tube 2. A prescribed gas is introduced into this pipe 13 from an outlet-pressure shifting valve 18 through an outlet side fluid resistor 15. Reference numeral 26 indicates a differential pressure gauge of diaphragm type. This gauge is adapted to detect a pressure difference between the inlet 8 and the outlet 9 both of the detecting pipe line. The pressure in inlet 8 is transmitted to a high pressure conduit 19 of differential pressure gauge through the inlet pressure detecting port 6, and the pressure in outlet 9 is transmitted to a low pressure conduit 20 of differential pressure gauge through the outlet side pressure transmission pipe 13. The pressure difference detected by differential pressure gauge 26 is generated in the course of the powder introduced from powder introducing port 7 being accelerated in the detecting pipe line 1 by the conveying gas blown into the detecting pipe line from sensor nozzle orifice. There is a relation with good linearity between the flow rate of powder in detecting pipe line 1 and the pressure difference detected by differential pressure gauge 26, as shown by working curve 90 in FIG. 6. Under these circumstances, the slope of working curve 90 varies in proportion to the flow rate of conveying gas through flowmeter 17. In addition, the working curve is displaced parallel upward, as shown by arrow 94 in FIG. 6, in proportion to the flow rate of gas through the inlet side fluid resistor 14, and is displaced parallel downward, as shown by arrow 93, in proportion to the flow rate of gas through the outlet side fluid resistor 15. Accordingly, the working curve can be made to pass the point 0 in FIG. 6 by means of modulating suitably valves 16' and 18. When this modulation of valves is achieved and the flow rates of conveying gas blown into the detecting pipe line 1 is read by the flowmeter 17, a working curve is established. Utilizing the established working curve as curve 90 in FIG. 6, the flow rate of powder can be obtained by the reading of the differential pressure gauge 26.

To vary the flow rate of a powder in the powder flow-rate measuring and controlling apparatus illustrated by FIG. 1 according to this invention, the degree of vacuum in the outlet 9 of detecting pipe line 1 is modulated by changing the flow rate of a driving gas 47 in an injector 46 composed of an injector nozzle 41 and an injector throat 42. In addition, if the conveying rate of powder in a conveying pipe 44 attached to the outlet of injector is too low, a conveying gas modulating conduit 43 can be provided at the outlet of injector throat 42 to introduce an additional gas for conveying therethrough. By this means, a suitable conveying rate of powder can be obtained. In this case, the flow rate of conveying gas can be set by means of a conveying gas modulating valve 36.

In the powder flow-rate measuring and controlling apparatus shown in FIG. 1, a control valve 38 is employed for maintaining a powder flow rate detected by the powder flow-rate measuring section of the apparatus at a constant value. More specifically, the control valve 38 compares a preset value of pressure difference stored therein with a pressure difference between a pressure given by a control valve low pressure conduit 22 and that given by a control valve high pressure conduit 23, and the difference between the preset value of pressure difference and the actual value of pressure difference is pressure amplified by a diaphragm arranged in the control valve. As a result, a gas having a source pressure regulated to a constant value from a control valve source pressure conduit 35 is converted to a driving gas 47 to feed the injector. The control valve 38 has the above-mentioned function as detailed hereinafter. A control valve constant pressure conduit 24 is provided for transmitting a constant pressure to the control valve. Such a constant pressure is necessary for allowing the control valve to amplify exactly a minute pressure difference and to perform the function mentioned above. Further, a powder flow-rate setting valve 25 is provided for passing a gas of constant pressure from a constant pressure valve 29 through a fluid resistor 21 and, thereby, adding a pressure for setting to the pressure at the inlet pressure detecting port 6 transmitted by the conduit 19. This powder flow-rate setting valve 25 always permits a gas of a constant minute flow rate to pass through the fluid resistor 21 for setting the powder flow rate. Then, said gas passes through inlet side fluid resistor 14 by way of the high pressure conduit 19 of differential pressure gauge is introduced into sensor nozzle 3 where said gas is added to the conveying gas. The resulting gas is blown into the detecting pipe line. Therefore, said gas from the valve 25 constitutes substantially a part of conveying gas. Said gas may be taken from flowmeter 17 by a conduit parallel to valves 16 and 16'. However, the pipe line shown in FIG. 1 may suffice because said gas has always a constant flow rate.

Figure 2:
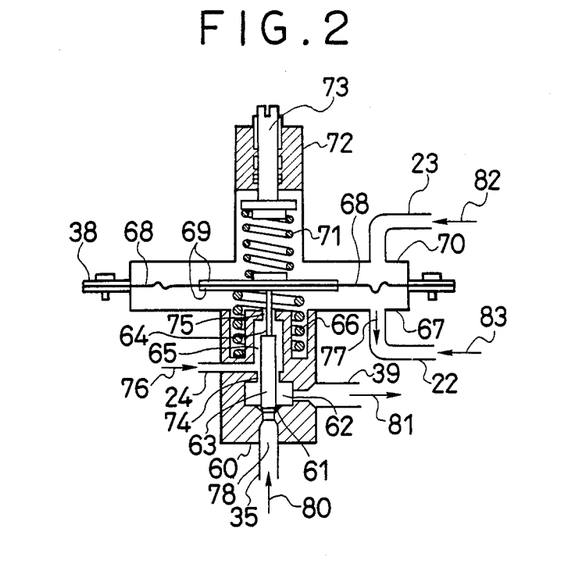
FIG. 2 is an enlarged sectional view of a part of the apparatus shown in FIG. 1.

The control valve 38 operates in such way as to maintain automatically the powder flow rate at a constant value. For example, when the powder flow rate decreases due to a change in level of the fluidized powder bed 51 in tank 50, the control valve 38 works to increase the flow rate of driving gas 47 fed to injector nozzle 41, and the powder flow rate reverts to the prescribed value. By contrast, when the powder flow rate increases due to the same fact, the control valve 38 works to lower the degree of vacuum by decreasing the flow rate of driving gas 47. For the function of the control valve 38 in accordance with this invention, it is necessary, as shown by FIG. 2, that the source pressure essentially required by control valve has an exactly constant value. Consequently, the system is so constituted that the source pressure 32 is regulated to a constant value by means of a large constant pressure valve 31 and then is fed to the system via conduits 33 and 35. Further, as the valves 16', 18 etc. employed in the apparatus of this invention is required to operate stably at a quite minute flow rate for a long period of time, the gas which passes these valves must be highly purified. It is necessary that the source gas is passed through a fine filter 30 and is fed to the constant pressure valve 29. After being regulated to an exactly constant value by the constant pressure valve 29, the gas is fed to various valves. Additionally, all gases to be fed to the system should not contain duly any oil droplets and any dust.

A pressure gauge 34 is provided for ascertaining the actuation of the large constant pressure valve. A pressure gauge 28 is provided for ascertaining the actuation of the constant pressure valve 29. A pressure gauge 40 is arranged to know the actuation of the control valve 38. As elucidated by the working curves in FIG. 6, a control valve which can be used for maintaining the constant powder flow rate by controlling directly the driving air at the inlet of injector should have the functions of being actuated stably even by a minute pressure difference, such as of the order of 1 mm water, and of being able to control the flow rate of driving air with sufficient sensibility. Moreover, an employable control valve must have a characteristic that the driving fluid decreases when a positive pressure difference is generated. These requirements are satisfied first with the control valve shown in FIG. 2 according to this invention. The required fundamental action of control valve for modulating the driving fluid is that the valve disk has a constant thrust in the direction of disk axis in all practically anticipatory situations. These fundamentals are accomplished by the structure illustrated in detail in FIG. 2.

The operation of the control valve will be described in detail in the following.

As represented by FIG. 2, the control valve consists of a control valve high pressure chamber 70 on the upper side and a control valve low pressure chamber 67 on the lower side, two chambers being separated by a diaphragm 68. The central part of diaphragm is reinforced with a center plate 69. A control valve body 60 is provided beneath the control valve low pressure chamber. A control valve source pressure gas 80 of an exactly regulated constant pressure is introduced into the lower part of control valve body via conduit 35. Above said conduit, a control valve main stem 63 is fitted so as to be slidable upward and downward along the central axis of control valve body, confronting a control valve port 61. The upper part of control valve main stem 63 forms a thin control valve sub-stem 64 of which the tip contacts with the center plate 69. The flow rate of control valve source pressure gas is regulated by a narrow gap between the periphery of under face of control valve main shaft 63 and the control valve port 61. The gas flows out from a control valve output conduit 39, as shown by arrow 81, by way of a control valve output chamber 62. The control valve main stem 63 is slidably fitted into a high pressure ring gap 74 in the direction of axis. The control valve sub-stem 64 incorporated with the control valve main stem 63 is fitted into a low pressure ring gap 75. The whole stem comprising the main stem and the sub-stem as integral parts is slidably supported in the direction of axis. A constant pressure chamber 65 is arranged around the upper part of main stem 63 and the lower part of sub-stem 64. The chamber 65 is so constructed that a control valve constant pressure which is exactly regulated to a value lower than the pressure of control output gas 81 can be applied thereto, as shown by arrow 76. Therefore, the bottom face of main stem is subject to a constant thrust upward in the axial direction by the control valve source pressure and the residual surface area in the upper end face of main stem resulting from subtraction of the cross sectional area of sub-stem from that of main stem is subject to a constant thrust downward in the axial direction. As a result, the whole valve stem is always subject to a thrust having a constant value exactly regulated. By virtue of this thrust, the tip of sub-stem pushes upward the center plate 69. To set the operating point of the stem, a certain resultant force of springs 66 and 67 which is set by an upper body 72 and a setting finger grip counteracts the aforementioned thrust generated by main stem and sub-stem. Thereto, the pressure difference between the upper surface and the lower surface both of diaphragm, as shown by arrows 82 and 83, is added to balance. The whole valve works on the basis of this balance. In this control valve, the controlled varying pressure of fluid acts merely on the side face of control valve main stem 63 in the control valve output chamber 62. Thus, the position of valve stem is exactly determined depending only on a minute pressure difference between both surfaces of diaphragm, without being subject to any reaction force due to the controlling action. Thus, the control valve of this invention has a remarkable characteristic that a quite exact output which corresponds to an input is obtained. Due to the accomplishment of this control valve, the powder flow-rate measuring and controlling apparatus according to this invention is accomplished. It should be noticed that the flow rate of gas leaked through the high pressure ring gap 74 into the control valve constant pressure chamber 65 varies when the main stem 63 moves. However, such a change in flow rate of leaked gas may be left out of consideration because the pressure in the control valve constant pressure chamber is always maintained at a constant value by means of a gas of exactly regulated constant pressure gas fed through the control valve constant pressure conduit 24. Further, in the embodiment shown by FIG. 2, the gas in control valve constant pressure chamber leaks through the low pressure ring gap 75 into the control valve low pressure chamber 67, passes through the control valve low pressure conduit 22, and finally flows into the outlet 9 of the detecting pipe line in FIG. 1. However, the flow rate of this leaking gas also is substantially kept constant as the pressure in the control valve constant pressure chamber 65 is regulated to a constant value. The operation of the system is practically unaffected. It should be noticed that leaking of gas is essentially required to occur through the high pressure ring gap 74. But, leaking of gas through the low pressure ring gap 75 is not always required. Leaking therethrough can be sealed by means of bellows and the like.

Figure 3A:
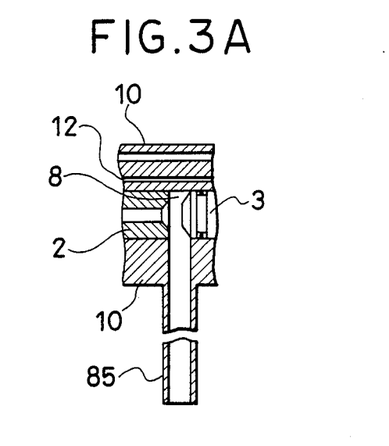
FIGS. 3A and 3B represent a longitudinal section and a cross section, respectively, of the inlet area of detecting pipe line in another embodiment of this invention.
Figure 3B:
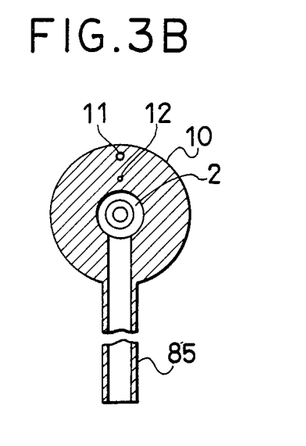
Figure 4A:
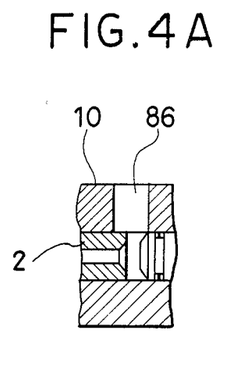
FIGS. 4A and 4B represent a longitudinal section and a cross section, respectively, of the inlet area of detecting pipe line in yet another embodiment of this invention.
Figure 4B:
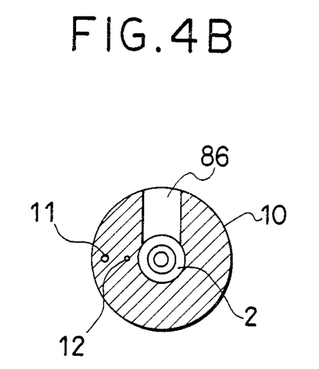
Figure 5A:
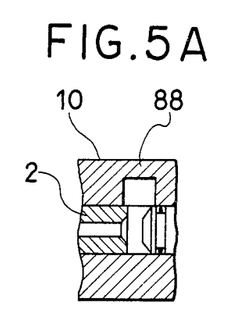
FIGS. 5A and 5B represent a longitudinal section and a cross section, respectively, of the inlet area of detecting pipe line in further other embodiment of this invention.
Figure 5B:
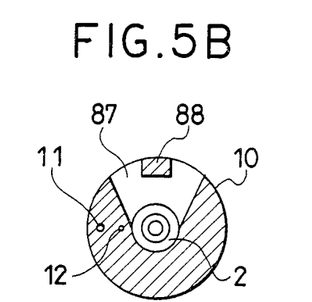

To obtain a working curve having good linearity in a wide range of flow rate in the case of the powder flow-rate measuring and controlling apparatus in accordance with this invention, it is very important that means for introducing a powder into the inlet 9 of detecting pipe line 1 is deliberately considered. Some embodiments thereof are illustrated in FIGS. 1, 3A, 3B, 4A, 4B, 5A and 5B. The powder introducing port 7 shown in FIG. 1 is divergent one which connects the inlet 8 with the fluidized powder bed and is preferred for introducing a powder having a relatively low density and a tendency to fluidization, such as powder coating materials. The embodiment represented by FIGS. 3A and 3B is a powder introducing conduit comprising a narrow pipe 85 for sucking upward the powder from fluidized powder bed and introducing it into the inlet 8 of detecting pipe line. By virtue of this means, the necessary condition that the whole sensor body should be arranged near the bottom of tank is eliminated. This leads to the possibility of arranging the whole sensor body in a position above the fluidized powder bed in tank. When it is the case, the material handling may be done with great facility. Even when the sensor body is located lower than the surface of the fluidized powder bed in tank as shown in FIG. 1, the introduction of powder into the inlet through such a narrow powder introducing conduit can be effective for maintaining a stable linear working curve in a broad range, in the case of a powder having a tendency for channeling. When the object of a measuring is a powder of high specific gravity, the application of a powder feeding short pipe 86 for feeding powder from above to inlet 8 of detecting pipe line, as illustrated by FIGS. 4A and 4B, enables the powder feeding to be stable in a wide range. Further, in the case of an objective powder, such as powder of very high specific gravity, the provision of a powder introducing side conduit 87 for introducing powder from the side into the inlet 8 of detecting pipe line and of a powder arresting member 88 straight over the inlet 8 of detecting pipe line, as illustrated by FIGS. 5A and 5B, may bring about a favorable result. The adoption of any one selected from the group of these various powder introducing means, as shown by FIGS. 1, 3A and 3B, 4A and 4B, and 5A and 5B, depending on the properties of an objective powder which have been elucidated by preliminary tests, is an appropriate means of obtaining a working curve with good linearity. Thereby, a convenient powder flow-rate detecting apparatus can be realized.

In the description of embodiments mentioned above, the means for modulating the powder flow rate is realized by the system wherein the pressure in the outlet of detecting pipe line 1 is changed by modulating the driving fluid of injector. However, means for modulating the powder flow rate is not limited thereto, but can be realized by the system wherein the pressure in the inlet 8 of detecting pipe line is changed. The latter system can be achieved, for example, by a modification that the powder tank 50 is replaced by a tank of closed type having a leak regulating valve and the pressure in the inlet 8 of detecting pipe line is caused to change by varying the pressure in the tank as a result of modulating the leakage.

The powder flow-rate measuring and controlling apparatus in accordance with this invention can maintain the characteristics in the stable state for a long period of time, as compared with the corresponding apparatus of the prior art. In addition, the working curve has the linearity in a wide measuring range. The construction of the apparatus is quite simplified. Moreover, the conveying rate of powder can be selected, as desired, in the wide rate range from high value to low value. By the apparatus, the flow rates of various powders can be exactly measured with versatility in response to wide variation in the properties, such as fluidity and specific gravity, of the powder, and can be regulated to constant values, if necessary.

What is claimed is:

1. A powder flow-rate measuring apparatus which is characterized by comprising a detecting pipe line having an inlet and an outlet, a nozzle for blowing a conveying gas into said inlet of detecting pipe line, means for measuring a flow rate of said conveying gas fed to said nozzle, means for controlling a flow rate of said conveying gas, means for introducing a powder into said inlet of detecting pipe line, and a device for detecting the pressure difference between a pressure at an inlet side pressure detecting port arranged upstream the outlet of said nozzle and a pressure at an outlet side pressure detecting port arranged at said outlet of detecting pipe line.

2. A powder flow-rate measuring apparatus according to claim 1 wherein said inlet side pressure detecting port is communicated with immediately downstream of said means for measuring a flow rate.

3. A powder flow-rate measuring apparatus according to claim 1 wherein means for modulating the pressure in the outlet of detecting pipe line and/or means for modulating the pressure in the inlet of detecting pipe line is provided.

4. A powder flow-rate measuring apparatus according to claim 2 wherein means for modulating the pressure in the outlet of detecting pipe line and/or means for modulating the pressure in the inlet of detecting pipe line is provided.

5. A powder flow-rate measuring apparatus according to claim 3 wherein said means for modulating the pressure in the outlet of detecting pipe line is an injector consisting of a throat and a driving nozzle.

6. A powder flow-rate measuring apparatus comprising a detecting pipe line having an inlet and an outlet, a nozzle for blowing a conveying fluid into said inlet of detecting pipe line, and means for detecting a pressure difference between a pressure at an inlet side pressure detecting port arranged upstream the outlet of said nozzle and a pressure at an outlet side pressure detecting port arranged at said outlet of detecting pipe line, which is characterized by being provided with means for separating a part of said conveying fluid to feed said inlet side pressure detecting port, means for modulating the pressure in the outlet of detecting pipe line and/or means for modulating the pressure in the inlet of detecting pipe line, said means for modulating the pressure in the outlet of detecting pipe line being an injector consisting of a throat and a driving nozzle, and an automatic control valve wherein said pressure difference between a pressure at the inlet side pressure detecting port and a pressure at the outlet side pressure detecting port constitutes an input therefor, a flow rate of driving fluid of said injector constitutes a controlled output therefrom, and means for setting a set point corresponding to said pressure difference is provided.

7. A powder flow-rate measuring apparatus according to claim 1 wherein said means for introducing a powder into said inlet of detecting pipe line is an approximately vertical pipe line in the fluidized powder bed, the lower end of said pipe line being the inlet for powder.

8. A powder flow-rate measuring apparatus according to claim 1 wherein said means for introducing a powder into said inlet of detecting pipe line is an approximately vertical short conduit which communicates with the fluidized powder bed, the upper end of said short conduit being the inlet for powder.

9. A powder flow-rate measuring apparatus according to claim 1 wherein said means for introducing a powder into said inlet of detecting pipe line is a powder introducing side conduit which communicates with the fluidized powder bed and is provided with a powder arresting member positioned straight over said inlet of detecting pipe line.

10. A powder flow-rate measuring apparatus according to claim 1 wherein said means for introducing a powder into said inlet of detecting pipe line is a short conduit which opens downward from said inlet of detecting pipe line to communicate with the fluidized powder bed.

* * * * *